(12) United States Patent
Shimizu et al.

(10) Patent No.: US 9,315,667 B2
(45) Date of Patent: Apr. 19, 2016

(54) STRETCHED POLYAMIDE FILM

(75) Inventors: Toshiyuki Shimizu, Inuyama (JP);
Yoshinori Miyaguchi, Inuyama (JP);
Takuro Endo, Inuyama (JP); Akinobu Nagara, Otsu (JP)

(73) Assignee: Toyobo Co., Ltd., Osaka (JP)

(*) Notice: Subject to any disclaimer, the term of this patent is extended or adjusted under 35 U.S.C. 154(b) by 207 days.

(21) Appl. No.: 13/985,496

(22) PCT Filed: Feb. 21, 2012

(86) PCT No.: PCT/JP2012/054061
§ 371 (c)(1),
(2), (4) Date: Aug. 14, 2013

(87) PCT Pub. No.: WO2012/117884
PCT Pub. Date: Sep. 7, 2012

(65) Prior Publication Data
US 2013/0323485 A1 Dec. 5, 2013

(30) Foreign Application Priority Data
Mar. 1, 2011 (JP) .................................. 2011-043723

(51) Int. Cl.
| | | |
|---|---|---|
| *B32B 7/02* | (2006.01) | |
| *C08L 77/06* | (2006.01) | |
| *C08J 5/18* | (2006.01) | |
| *B29C 55/02* | (2006.01) | |
| *B29C 55/14* | (2006.01) | |
| *B29K 77/00* | (2006.01) | |

(52) U.S. Cl.
CPC .............. *C08L 77/06* (2013.01); *B29C 55/023* (2013.01); *B29C 55/143* (2013.01); *C08J 5/18* (2013.01); *B29K 2077/00* (2013.01); *C08J 2377/02* (2013.01); *Y10T 428/24942* (2015.01)

(58) Field of Classification Search
CPC .. B29C 55/023; B29C 55/143; C08J 2377/02; C08J 5/18; Y10T 428/24942
See application file for complete search history.

(56) References Cited

U.S. PATENT DOCUMENTS

| | | | |
|---|---|---|---|
| 5,541,011 A | 7/1996 | Takashige et al. | |
| 5,718,965 A | 2/1998 | Shiroeda et al. | |
| 5,968,665 A | 10/1999 | Shiroeda et al. | |
| 2008/0113177 A1* | 5/2008 | Sueoka et al. | 428/304.4 |
| 2011/0021719 A1 | 1/2011 | Yuki et al. | |

FOREIGN PATENT DOCUMENTS

| | | |
|---|---|---|
| CN | 1349458 A | 5/2002 |
| CN | 101835608 A | 9/2010 |
| EP | 2270078 A1 | 1/2011 |
| JP | H03-203933 A | 9/1991 |
| JP | H08-174663 A | 7/1996 |
| JP | H11-286544 A | 10/1999 |
| JP | 2003-020349 A | 1/2003 |
| JP | 2004-181776 A | 7/2004 |
| JP | 2006-205711 A | 8/2006 |
| JP | 2009-119843 A | 6/2009 |
| JP | 2009-154294 A | 7/2009 |
| JP | 2009-234034 A | 10/2009 |
| JP | 2010-269557 A | 12/2010 |

OTHER PUBLICATIONS

Chinese Patent Office, The First Office Action in Chinese Patent Application No. 201280011033.5 (Mar. 26, 2015).
European Patent Office, Extended European Search Report in European Patent Application No. 12752559 (Mar. 17, 2015).
Japanese Paten Office, International Search Report in International Patent Application No. PCT/JP2012/054061 (May 22, 2012).
European Patent Office, Communication Pursuant to Article 94(3) EPC in European Patent Application No. 12752559.0 (Oct. 27, 2015).
Taiwan Patent Office, First Office Action in Taiwanese Patent Application No. 101106196 (Mar. 27, 2015).

* cited by examiner

*Primary Examiner* — Aaron Austin
*Assistant Examiner* — Lawrence Ferguson
(74) *Attorney, Agent, or Firm* — Leydig, Voit & Mayer, Ltd.

(57) ABSTRACT

The invention provides a stretched polyamide film with a main constituent that is nylon 6. At least one surface layer of the polyamide film satisfies conditions (1) and (2), and the stretched polyamide film satisfies condition (3), which pertain to an orientation factor, an intensity ratio of absorption, and a heat shrinkage rate, respectively, as defined herein.

15 Claims, No Drawings

STRETCHED POLYAMIDE FILM

TECHNICAL FIELD

The present invention relates to a stretched polyamide film. More specifically, the present invention relates to a stretched film for packaging purposes or industrial purposes which exhibits excellent adhesive property and lamination strength and which has excellent resistance to break and pinhole when the film is applied to a bag.

BACKGROUND ART

A stretched polyamide film composed of nylon 6 has been broadly used for packaging purposes due to excellent features such as toughness, flexibility and transparency. For packaging purposes, such a film is mainly used in the forms of a bag and a cover of a cup. Specifically, a bag is prepared by laminating a thermal adhesion layer, i.e. a sealant layer, composed of polyolefin or the like on the inside of the polyamide film and heat-sealing the sealed part. A cover is prepared by covering a cup composed of polyolefin or the like with the polyamide film on a flange part and heat-sealing the flange part.

When a stretched polyamide film is used for the above-described packaging purposes, high heat-sealing strength and lamination strength are required.

It is conventionally known that adhesive property is improved by laminating a layer of an amorphous resin or a highly-adherent resin on a surface layer with coating or coextrusion (for example, Patent Document 1). However, the method has problems such as blocking and complicated production steps. Further, in the improved method thereof, there is a problem that the adhesive strength between polyamide film and a highly-adherent layer as the surface layer is insufficient.

It is conventionally known that adhesive property can be improved by increasing a heat fixation temperature to disrupt the orientation in the surface layer. However, the method has problems that high temperature is required for sufficient adhesive property and a film becomes brittle due to excessive heat treatment.

It is known that when a small amount of semi-aromatic polyamide is added to aliphatic polyamide, strength for coping with cohesive failure can be improved, the adverse influence due to moisture can be minimized, and the propagation of shock by a fall can be prevented (for example, Patent Document 1). However, the method has a problem that lamination strength is insufficient.

It is known that stretching property is improved and thickness unevenness is decreased by adding a polyamide resin having a specific chemical structure (for example, Patent Document 2). However, there is no description that the method is applied for improving adhesive property in Patent Document 2 and the method has a problem that lamination strength is not sufficiently improved.

It is known that a strength for coping with prick and mechanical strength are improved by adding a stratified silicate salt to make a planar orientation coefficient to be 0.05 or more (for example, Patent Document 3). However, there is no description that lamination strength and adhesive property are improved, though there are descriptions of a stretch due to moisture absorption and lamination workability. In addition, the method has problems that a surface layer is susceptible to a cleavage and lamination strength is not sufficient.

PRIOR ART

Patent Document

Patent Document 1: JP 2006-205711 A
Patent Document 2: JP H11-286544 A
Patent Document 3: JP 2003-20349 A

DISCLOSURE OF THE INVENTION

Problems to be Solved by the Invention

The present invention was completed on the background of the above-described problems of the prior arts, and the objective of the present invention is to provide a stretched polyamide film which is excellent in adhesive property and lamination strength, does not become brittle even by excessive heat treatment and has mechanical properties that is intrinsic in a polyamide film.

Means for Solving the Problems

The present inventors conducted intensive studies to solve the above problems. As a result, the present inventors complete the present invention.

The present invention is described as follows.
[1] A stretched polyamide film, wherein
  a main constituent is nylon 6;
  at least one surface layer meets the following conditions (1) and (2); and
  the stretched polyamide film meets the following condition (3):
  (1) a relaxation degree of a surface layer orientation measured by IR spectroscopy is within a range of not less than 0.3 and not more than 0.5;
  (2) a crystallization degree of a surface layer measured by IR spectroscopy is within a range of not less than 1.0 and not more than 1.4;
  (3) a heat shrinkage rate (%) in TD direction at 160° C. for 10 minutes is within a range of not less than 0.6 and not more than 4.
[2] The stretched polyamide film according to the above [1], wherein
  the surface layer contains nylon 6 and a resin other than nylon 6;
  the surface layer meets the conditions (1) and (2); and
  the stretched polyamide film meets the condition (3).
[3] The stretched polyamide film according to the above [1], comprising at least two layers composed of nylon 6;
  wherein
  relative viscosities of the layers composed of nylon 6 are different each other;
  the stretched polyamide film has the layer composed of nylon 6 having higher relative viscosity on the surface;
  the surface layer meets the conditions (1) and (2); and
  the stretched polyamide film meets the condition (3).

Effect of the Invention

It is possible according to the present invention to provide a stretched polyamide film which is excellent in adhesive property and lamination strength, does not become brittle even by excessive heat treatment and has mechanical properties that is intrinsic in a polyamide film.

Mode for Carrying Out the Invention

Hereinafter, the stretched polyamide film of the present invention is described in detail.

As a conventional art, standard nylon 6 tends to be insufficient in lamination strength under a normal condition. It is thought to be the reason that when nylon 6 is stretched to be a biaxially-stretched film which has uniform thickness and good physical properties, a molecular orientation of the surface in a plane direction becomes higher to lead to cleavage.

When a heat fixation temperature after biaxially-stretching is increased, a molecular orientation is disturbed. As a result, lamination strength and heat resistance, i.e. heat shrinkage rate, can be improved. However, when the heat fixation temperature is raised up to achieve high lamination strength, the film becomes brittle; and thereby, mechanical strength, particularly resistance to shock, is decreased.

In order to make it easier to disturb a molecular orientation, there is a method for copolymerizing other monomer. According to such a method, a molecular orientation can be disturbed on a surface layer within a heat fixation temperature range in which embrittlement is not observed and lamination strength can be improved. However, in the case of copolymerization in a normal condition, monomers are randomly copolymerized. As a result, a melting point of the obtained copolymer is substantially lowered and both of heat resistance and mechanical properties are decreased. In other words, it is difficult to maintain all of the above-described qualities of a nylon 6 film. When a ratio of copolymerization was decreased to the extent that mechanical properties of a film were lowered, lamination strength could not be improved.

It is possible to decrease the degree of a molecular orientation by adding other resin component during film-forming. However, when an additive amount was small, the effect could not be shown. Even when only a little effect was shown, the variation of lamination strength was large at the time to peel the lamination. In addition, the lamination strength measured with immersing the area to be peeled in water, which lamination strength is required for packaging of liquid, was decreased. When an additive amount was raised up to the extent that high lamination strength could be exhibited, all of the above-described required qualities could not be satisfied similarly to the case of copolymerization. For example, heat resistance and mechanical properties were remarkably decreased, and transparency was also decreased.

Therefore, it has been considered to be impossible to produce a nylon 6 type film of which lamination strength is high, of which heat shrinkage rate is small and of which toughness is sufficient.

The present inventors thought that the condition of a molecular orientation at the part of the surface affects on lamination strength, and earnestly studied a method for measuring the molecular condition at the part of the surface. In addition, the present inventors investigated various methods for effectively relaxing an orientation, such as the above-described change of heat fixation temperature, copolymerization and blending of other resin. As a result, the present inventors made it clear what is a nylon 6 film having high lamination strength, appropriate heat shrinkage rate and sufficient toughness, and found that a nylon 6 film which has been regarded to be impossible can be produced by controlling the relaxation condition of an orientation and a crystallization condition in a surface layer, which conditions can be recognized by specific peaks obtained by IR-ATR method.

In addition, the present inventors found the method for stably controlling the above-described relaxation condition of an orientation and a crystallization condition in a surface layer.

First, the film according to the present invention having the above-described relaxation condition of an orientation and crystallization condition in the surface layer is described.

With respect to the film according to the present invention, a relaxation degree of a surface layer orientation measured by IR spectroscopy is in a range of not less than 0.3 and not more than 0.5. The relaxation degree is preferably not less than 0.31 and more preferably not less than 0.32. In addition, the relaxation degree is preferably not more than 0.48 and more preferably not more than 0.46. When the relaxation degree is less than 0.3, lamination strength may not be sufficiently improved in some cases. When the relaxation degree is more than 0.5, it may become difficult in some cases to maintain the crystallization degree within a preferable range. As a result, it may become difficult to maintain the heat resistance and mechanical properties such as strength against impact, which are innate properties of a nylon 6 film, and to stably produce the film due to need for high heat fixation temperature.

With respect to the film according to the present invention, a crystallization degree of a surface layer measured by IR spectroscopy is in a range of not less than 1.0 and not more than 1.4. The crystallization degree is preferably not less than 1.05 and more preferably not less than 1.07. In addition, the crystallization degree is preferably not more than 1.39 and more preferably not more than 1.38.

When the crystallization degree is less than 1.0, it may become difficult in some cases to maintain the heat resistance and mechanical properties such as strength against impact, which are innate properties of a nylon 6 film. When the crystallization degree is more than 1.4, lamination strength may be insufficient, and strength against impact may be decreased in some cases since crystallization may be excessively preceded.

Further, with respect to the film according to the present invention, a heat shrinkage rate in TD direction at 160° C. for 10 minutes is within a range of not less than 0.6% and not more than 4%. The heat shrinkage rate is preferably not less than 0.7% and more preferably not less than 0.8%. In addition, the heat shrinkage rate is preferably not more than 3.5% and more preferably not more than 3.0%. When the heat shrinkage rate is more than 4%, a stable process may possibly become difficult in some cases, since the film may be curled or shrunk by being heated in the next step for lamination or printing. It is possible to adjust the heat shrinkage rate to less than 0.6%; however, such a case is not preferred, since the film may dynamically become brittle and the realistic productivity may be decreased.

It is preferred that the film of the present invention has an elastic modulus at 65% RH within not less than 1.5 GPa and not more than 4.0 GPa in both directions of MD and TD. The elastic modulus is preferably not less than 1.6 GPa and more preferably not less than 1.7 GPa. In addition, the elastic modulus is preferably less than 3.7 GPa and more preferably less than 3.5 GPa. When the elastic modulus is less than 1.5 GPa, there may be deviation in pitch at the time of printing. In addition, when the elastic modulus is more than 4.0 GPa, the realistic productivity may be decreased.

It is preferred that the melting point measured by DSC of the present invention film according to the present invention is within a range of not less than 200° C. and not more than 230° C. The melting point is preferably not less than 205° C. and more preferably not less than 210° C. In addition, the melting point is preferably not more than 230° C. and more preferably not more than 228° C. When the melting point is less than 200° C., the heat resistance may be decreased. In addition, when the melting point is more than 230° C., a heat resistance effect may not be substantially improved any more.

It is preferred that a haze value of the present invention film is within a range of not less than 0.5% and not more than 20%. The haze value is preferably not less than 0.7% and more preferably not less than 0.8%. In addition, the haze value is preferably not more than 19% and more preferably not more than 18%. When the haze value is less than 0.5%, a slippery property may be decreased. In addition, when the haze value is more than 20%, content may be difficult to be seen.

It is preferred that a value of Tv, which is an index of thickness uniformity and which is represented by "the difference between the maximum value and the minimum value/average thickness", is within a range of not less than 2% and not more than 50%. The Tv value is preferably not less than 2.3% and more preferably not less than 2.5%. In addition, the Tv value is preferably not more than 40%, more preferably not more than 30%, and most preferably not more than 15%. It is possible to adjust the Tv value to less than 2%; however, the productivity may be decreased. In addition, when the Tv value is more than 50%, the winding appearance may become poor and wrinkle may be caused during lamination.

Next, the method for stably controlling the relaxation condition of an orientation and crystallization condition in the surface layer is described.

In a first method, other resin is introduced as a graft polymer or a block polymer in the molecular chain of nylon 6 which is a raw material of the film.

The orientation can be effectively relaxed during heat fixation without significantly decreasing crystallinity, for example, without becoming amorphous, by composing the film of a graft copolymer or a block copolymer.

As a method for introducing other resin to be a block copolymer in order to effectively relax an orientation, it is possible to chemically synthesize a graft polymer or a block polymer and add the polymer. Alternatively, the present inventors found that a molecular orientation can be sufficiently relaxed in a normal heat fixation condition by preliminarily melt-blending other resin component using an extruder before film-forming to prepare a masterbatch and adding the masterbatch in the extruder again in the production process according to the present invention.

It is difficult to find out the cause of the above finding; however, the present inventors found that a block copolymer is partly synthesized by reacting nylon 6 with other resin component and a small amount of the block copolymer can effectively inhibit an orientation. For example, such a block copolymer is synthesized by an amide-amide interchange reaction in case where a polyamide resin is used as other resin or by an amide-ester interchange reaction in case where a polyester resin is used as other resin. In other words, a block copolymer, not a random copolymer, can relax a molecular orientation even by an addition in a smaller amount. In addition, the present inventors found that mechanical properties or the like can be prevented from decreasing to the minimum by such an addition in a small amount.

In a second method, a layer of nylon 6 having a high molecular weight is laminated as the surface layer.

The present inventor found that when films are formed from resins which are similarly composed of nylon 6 but of which molecular weights are different each other and biaxially-stretched films are produced by stretching and heat-fixing the films, a molecular orientation of the film composed of nylon 6 having a higher molecular weight is decreased. It was predictable from the above finding that a film of which orientation of the surface layer is decreased can be obtained and all of the target required qualities can be satisfied by laminating a layer composed of nylon having a higher molecular weight on the surface. The present inventors experimentally confirmed the effect and that the intended film can be produced.

The stretched polyamide film according to the present invention is characterized in having an oriented layer which is mainly composed of nylon 6 on at least one surface layer. In the present invention, the oriented layer is referred to as "A layer". Any film constitution can be applied to the present invention, and the present invention is industrially valued since all of lamination strength, heat shrinkage rate and mechanical properties can be satisfied by the present invention. In particular, such an effect has been conventionally regarded as impossible in a single layer film, but the effect can be achieved by the present invention. A layer constitution is not particularly limited, and is exemplified by a singly layer constitution consisting of A layer only, a double layer constitution consisting of two kinds, such as "A layer/other resin layer (B layer)", a triple layer constitution consisting of two kinds, such as "A layer/B layer/A layer", and a triple layer constitution consisting of three kinds, such as "A layer/B layer/other resin layer (C layer)", which C layer is different from both of A layer and B layer. A layer constitution which is symmetric in a thickness direction is preferred in terms of curling. Hereinafter, a single layer constitution consisting of A layer only is referred to as "A layer" or "surface layer". The term "surface layer" in the case of a single layer constitution means the surface.

With respect to a nylon 6 resin used in the present invention, various raw materials can be copolymerized. However, an amount of copolymerization is preferably small, since physical properties such as crystallinity, mechanical properties and heat resistance may be decreased due to copolymerization. An amount of copolymerization is exemplified by not more than 8%, preferably not more than 5%, and more preferably not more than 3%. A copolymerization component is specifically exemplified by a lactam copolymerization component such as enantholactam, capryl lactam and lauryl lactam; a co-amino acid copolymerization component such as 6-aminocaproic acid, 7-aminoheptanoic acid, 9-aminononanoic acid and 11-aminoundecanoic acid. A diacid is exemplified by adipic acid, glutaric acid, pimelic acid, suberic acid, azelaic acid, sebacic acid, undecanedioic acid, dodecadioic acid, hexadecadioic acid, eicosanedioic acid, eicosadienedioic acid and 2,2,4-trimethyladipic acid. A diamine is exemplified by ethylenediamine, trimethylenediamine, tetramethylenediamine, hexamethylenediamine, pentamethylenediamine, undecamethylenediamine, 2,2,4- (or 2,4,4-)trimethylhexamethylenediamine, cyclohexanediamine and bis(4,4'-aminocyclohexyl)methane. The copolymer may contain a small amount of an aromatic dicarboxylic acid and a small amount of an aromatic diamine. Such an aromatic dicarboxylic acid is exemplified by terephthalic acid, isophthalic acid, 2,6-naphthalenedicarboxylic acid and xylylenedicarboxylic acid, and such an aromatic diamine is exemplified by m-xylylenediamine.

The lower limit of relative viscosity of nylon 6 of the surface layer is preferably 2.2, more preferably 2.3, even more preferably 2.4, and most preferably 2.5. The relative viscosity can be served as a barometer for molecular weight and abbreviated to "RV". When the relative viscosity is less than the above, biaxially-stretching may be difficult in some cases due to too fast crystallization rate. The upper limit of relative viscosity (RV) of nylon 6 of the surface layer is preferably 4, more preferably 3.9, even more preferably 3.8, particularly preferably 3.6, and most preferably 3.5. When the relative viscosity is more than the above, productivity may be decreased in some cases since load on an extruder may become too high.

In the present invention, a relative viscosity is measured by dissolving 0.5 g of a polymer in 50 ml of 97.5% sulfuric acid and using the solution at 25° C.

According to the present invention, a stretched polyamide film which is excellent in various properties can be produced by adjusting the resin composition of the surface layer and heat fixation temperature of the film so that the relaxation degree of a molecular chain orientation and the crystallization degree of nylon 6 which is a main component of the film surface layer is included in the specific range. The relaxation degree and crystallization degree are measured by analysis method described later.

In the present invention, a molecular orientation in the surface layer of A layer can be inhibited by adding other material which is different in composition or molecular weight, and the relaxation of an orientation can be made more likely by heating. As a result, the toughness of nylon 6 can be maintained and heat shrinkage rate can be adjusted in an appropriate range while lamination strength is improved.

Next, a first method for producing the stretched polyamide film of the present invention is described.

As a resin which is added for controlling the orientation of nylon 6 in the surface layer, a resin which has a polar group and which is capable of exchange reaction with the amide bond of polyamide is preferred. Such a resin is exemplified by an amide group-containing resin, an ester group-containing resin and a urethane group-containing resin. In the examples, an amide group-containing resin is most preferred.

An amide group-containing resin is exemplified by a polyamide resin which is obtained by polycondensation of a lactam having three or more rings, a co-amino acid, a diacid, a diamine and the like. Specifically, a lactam compound is exemplified by enantholactam, capryllactam and lauryllactam in addition to ϵ-caprolactam described above. A ω-amino acid is exemplified by 6-aminocaproic acid, 7-aminoheptanoic acid, 9-aminononanoic acid and 11-aminoundecanoic acid. A biacid is exemplified by adipic acid, glutaric acid, pimelic acid, suberic acid, azelaic acid, sebacic acid, undecanedione acid, dodecadione acid, hexadecadione acid, eicosanedione acid, eicosadienedione acid and 2,2,4-trimethyladipic acid. A diamine is exemplified by ethylenediamine, trimethylenediamine, tetramethylenediamine, hexamethylenediamine, pentamethylenediamine, undecamethylenediamine, 2,2,4- (or 2,4,4-)trimethylhexamethylenediamine, cyclohexanediamine and bis-(4,4'-aminocyclohexyl)methane. In addition, a small amount of an aromatic dicarboxylic acid and a small amount of an aromatic diamine can be used. An aromatic dicarboxylic acid is exemplified by terephthalic acid, isophthalic acid, 2,6-naphthalenedicarboxylic acid and xylylenedicarboxylic acid. An aromatic diamine is exemplified by p- and m-xylylenediamine. A polymer or a copolymer which is obtained by polycondensating the above compounds can be used. Such a polymer or a copolymer is exemplified by nylon 6, 7, 11, 12, 6,6, 6,9, 6,11, 6,12, 6T, 6I, MXD6 (m-xylene adipamide 6), 6/6,6, 6/12, 6/6T, 6/6I and 6/MXD6. One of the above-described amino group-containing resin can be singly used, or two or more resins can be used in combination.

It is preferred that an amide group-containing resin includes not more than 50 mole % of ϵ-caprolactam. The ratio is more preferably not more than 40 mole %, even more preferably not more than 30 mole %, particularly preferably not more than 20 mole %, and most preferably not more than 10 mole %. When more than 50 mole % of ϵ-caprolactam is copolymerized, a molecular orientation can be effectively relaxed but the crystallinity and mechanical properties of nylon 6 which is a base resin may be considerably decreased.

In particular, as an amide group-containing resin, m-xylylene group-containing polyamide polymer of which diamine component is mainly m-xylylenediamine or a mixed xylylenediamine consisting of m-xylylenediamine and p-xylylenediamine and of which dicarboxylic acid component is mainly α,ω-aliphatic dicarboxylic acid having a carbon atom number of not less than 6 and not more than 12 is preferred. When a mixed xylylenediamine is used as a diamine component, a concentration of p-xylylenediamine in total xylylenediamine is preferably not more than 30 mole %. In addition, it is preferred that a ratio of a constitution unit consisting of xylylenediamine and an aliphatic dicarboxylic acid in a molecular chain is at least not less than 70 mole %.

A m-xylylene group-containing polyamide polymer is exemplified by a homopolymer such as poly-m-xylyleneadipamide, poly-m-xylylenepimelamide, poly-m-xylylenesuberamide, poly-m-xylyleneazelamide, poly-m-xylylenesebacamide and poly-m-xylylenedodecanediamide; and a copolymer such as m-xylylene/p-xylyleneadipamide copolymer, m-xylylene/p-xylylenepimelamide copolymer, m-xylylene/p-xylylenesuberamide copolymer, m-xylylene/p-xylyleneazelamide copolymer, m-xylylene/p-xylylenesebacamide copolymer and m-xylylene/p-xylylenedodecanediamide copolymer; and a copolymer which is obtained by partially copolymerizing an aliphatic diamine such as hexamethylenediamine, an alicyclic diamine such as piperazine, an aromatic diamine such as p-bis-(2-aminoethyl)benzene, an aromatic dicarboxylic acid such as terephthalic acid, a lactam such as ϵ-caprolactam, ω-aminocarboxylic acid such as aminoheptanoic acid or an aromatic aminocarboxylic acid such as p-aminomethylbenzoic acid with the component of the above homopolymer or copolymer.

An amide group-containing resin is preferably exemplified by nylon 9, nylon 11, nylon 12, nylon 6,10 and a resin obtained by copolymerizing terephthalic acid with the above nylons.

A polyamide elastomer may be used in combination with the above resins.

A thermoplastic elastomer used in the present invention is exemplified by a polyamide elastomer such as a block or random copolymer of a polyamide resin and PTMG (polytetramethyleneglycol) or PEG (polyethyleneglycol) or the like. A polyamide resin is exemplified by nylon 6 and nylon 12.

When the polyamide film has a laminated structure, a resin which is added for controlling an orientation of nylon 6 in the surface layer preferably contains the same monomer component as that contained in the layer adjacent to the surface layer.

The lower limit of relative viscosity of the particularly preferred amide group-containing resin of the present invention is preferably 2.2, more preferably 2.3, even more preferably 2.4, and particularly preferably 2.5. The relative viscosity can be served as a barometer for molecular weight and may be abbreviated to "RV". When the relative viscosity is less than the above, biaxially-stretching may be difficult in some cases due to too fast crystallization rate.

The upper limit of the relative viscosity (RV) is preferably 4, more preferably 3.9, even more preferably 3.8, particularly preferably 3.6, and most preferably 3.5. When the relative viscosity is more than the above, productivity may be decreased in some cases since load on an extruder may become too high.

Method of Addition

It is needed for the present invention that other resin component is added in order to control a molecular orientation. In such a case, it is preferred that other resin component is preliminarily kneaded with a nylon 6 resin using an extruder and the kneaded mixture is used for film-forming. Hereinafter, the kneaded mixture is referred to as "masterbatch". For producing a masterbatch, it is needed that a nylon 6 resin and other resin component are mixed and added to a general extruder, the mixture is melted and kneaded, and the kneaded mixture is re-pelletized. When a masterbatch is prepared, a nylon 6 resin is partially reacted with other resin component to obtain a block copolymer. Such a block copolymer contributes to an achievement of conflicting required qualities.

A general method is available for the preparation, but it is needed that a temperature of a resin is adjusted to a range of not less than 250° C. and not more than 350° C. When the temperature is less than 250° C., a resin may not be sufficiently melted and the effect of a masterbatch may be reduced. When the temperature is more than 350° C., a resin may become depleted, the molecular weight thereof may be decreased and mechanical strength may be lowered.

A detention time of a resin in an extruder is different depending on the used extruder and can not be unconditionally set. In general, when the detention time is too short, mixing may be insufficient. When the detention time is too long, a resin may become depleted. Similarly in the present invention, when the detention time is too short, kneading may not be effective and a needed amide exchange reaction may not proceed. In addition, when the detention time is too long, a reaction such as amide exchange reaction may excessively proceed and the obtained resin may be substantively similar to a resin obtained by random copolymerization in addition to a problem of deterioration of resin. Such a resin may not be suitable for the present invention.

Even when a masterbatch is not used, a similar effect can be achieved by using an extruder which has large L/D during film-forming and extruding a resin one time to proceed an exchange reaction similarly to the case of using a masterbatch. In addition, two or more extruders can be connected. However, the above-described methods require a large-size device during film-forming and lead to higher cost. In addition, when L/D is adjusted to large, it is difficult to adjust conditions and produce an extruder itself. Therefore, it is most suitable method to use a masterbatch.

As a nylon 6 used for a masterbatch, a resin which is recycled from film-production process, such as edge part obtained in a stretching step, may be used. In a case of multi-layered film, a recycled resin may be directly used or pelletized to be used as a substitute for a masterbatch which contains nylon 6 and other resin. In such a case, the amount thereof may be adjusted by further adding other resin.

The polyamide film may often contain a lubricant, a stabilizing agent such as an antioxidant, an ultraviolet absorbing agent, an agent for improving pinhole resistance, and the like described later. To a masterbatch which contains the above agents, the above other resin may be further added.

The lower limit of an amount of other resin to be added to the surface layer other than nylon 6 as a base resin is preferably 3 wt %, more preferably 5 wt %, and most preferably 6 wt %. When the amount is lower than the above, an orientation of the surface layer may not be sufficiently relaxed in some cases.

The upper limit of an amount of other resin to be added to the surface layer other than nylon 6 as a base resin is preferably 18 wt %, more preferably 15 wt %, and most preferably 12 wt %. When the amount exceeds the above range, the crystallization degree of the surface layer may be decreased in some cases.

Next, a second method is described.

In the present invention, properties which are contradictory each other, such as lamination strength, mechanical properties and heat resistance, can be obtained by adjusting a molecular orientation and crystallization coefficient of the surface layer to the specific range. For the realization, a specific other resin component is added as described above. Similarly, a molecular orientation in the surface layer can be decreased by laminating a nylon 6 resin of which molecular weight is different on the surface layer only, since different molecular weight gives rise to difference in a molecular orientation.

Under the same conditions during film-forming, when a molecular weight of nylon 6 is higher, a molecular orientation is decreased but a heat shrinkage rate is increased. Due to such properties, the film of the present invention can be produced by forming the surface layer with nylon 6 of which molecular weight is higher.

The lower limit of relative viscosity of nylon 6 in the surface layer is preferably 2.2, more preferably 2.3, even more preferably 2.4, and particularly preferably 2.5. The relative viscosity can be served as a barometer for molecular weight and may be abbreviated to "RV". When the relative viscosity is less than the above, biaxially-stretching may be difficult in some cases due to too fast crystallization rate.

The upper limit of relative viscosity (RV) of nylon 6 in the surface layer is preferably 4, more preferably 3.9, even more preferably 3.8, particularly preferably 3.6, and most preferably 3.5. When the relative viscosity is more than the above, productivity may be decreased in some cases since load on an extruder may become too high.

With respect to the difference of a molecular weight against a nylon 6 resin other than the surface layer, the value of RV is not less than 0.1, preferably not less than 0.2, most preferably not less than 0.3, and preferably not more than 1.0, not more than 0.8 or not more than 0.7. When the value of RV is less than 0.1, sufficient effect may not be achieved in some cases. When the value of RV is more than 1.0, the difference of a melt viscosity may become too large and it may be difficult in some cases to stably produce a uniform multi-layered film.

It is preferred to singly use a nylon 6 having a high molecular weight for forming the surface layer, but such a nylon 6 may be blended with a nylon 6 which is a base resin to be used. The lower limit of an amount of a resin of which molecular weight is different to be added to the surface layer is preferably 50 mass %, more preferably 55 mass %, and most preferably 60 mass %. The difference of RV and an additive amount are lower than the above, a relaxation degree of a surface orientation may be insufficient and the effects may be reduced.

The lower limit of the total thickness of the surface layer is preferably 1 μm and more preferably 2 μm. When the thickness is less than the above, layers may be peeled and lamination strength may be decreased in some cases.

The upper limit of the total thickness of the surface layer is preferably 180 μm, more preferably 100 μm, even more preferably 50 μm, particularly preferably 28 μm, and most preferably 25 μm. When the thickness is more than the above, the better effect of mechanical properties of a biaxially-stretched film may not be achieved.

The lower limit of a film thickness is preferably 5 μm and more preferably 9 μm. When the film thickness is less than the above, a handling property as a packaging material may be worse and strength may be decreased in some cases.

The upper limit of a film thickness is preferably 180 μm, more preferably 100 μm, even more preferably 50 μm, particularly preferably 28 μm, and most preferably 25 μm. When the film thickness is more than the above, a handling property as a packaging material may be worse in some cases.

When the polyamide film of the present invention is laminated, very excellent peeling resistance property, i.e. lamination strength, can be achieved.

The above-described lamination strength can be generally measured as follows. The film is laminated with a polyolefin film having a thickness of 40 μm to obtain a laminated film, and a sample having a width of 15 mm and a length of 200 mm is cut from the laminated film. The sample is peeled between the polyamide biaxially-stretched film layer and the polyolefin film layer at a peel angle of 180° under the condition of 23° C. and 65% relative humidity, and the strength at the peeling is measured.

The lower limit of lamination strength (N/15 mm) is preferably 6.5 and more preferably 6.6. When the film having lamination strength of less than the above is used as a bag or the like and a shock is given to the film, the film may be easily broken in some cases.

The upper limit of lamination strength (N/15 mm) is preferably 10. When lamination strength is more than the above, the better practical effect may not be achieved any more.

The polyamide laminated biaxially-stretched film according to the present invention is excellent in an elastic recovery property under an ordinary temperature and low temperature, shock resistance property and flexural fatigue resistance property. In addition, the present invention film can be effectively processed. For example, the present invention film can be effectively printed and laminated. Therefore, the present invention film is suitable as various packaging materials.

The lower limit of impact strength is preferably 0.8 J and most preferably 0.9 J. When the film having impact strength of less than the above is used as a bag or the like and great shock is given to the film, a sealing part may have cracks and the a bag may be broken in some cases.

The upper limit of impact strength is preferably 1.4 J and particularly preferably 1.3 J. When impact strength is more than the above, the better practical effect may not be achieved in some cases any more.

For example, the polyamide laminated biaxially-stretched film according to the present invention can be produced by the following production method.

In order to obtain an unstretched sheet, a raw material resin is melted and extruded using an extruder in membrane from a T die on a cooling roll to cool the resin.

A temperature for melting a resin is preferably not less than 220° C. and not more than 350° C. When the temperature is less than the above, a resin may not completely melted and the appearance may become poor in some cases. When the temperature is more than the above, a resin may become depleted, a molecular weight may be decreased and the appearance may become poor in some cases.

A temperature of a die is preferably not less than 250° C. and not more than 350° C. A temperature of a cooling roll is not less than 0° C. and not more than 80° C.

In accordance with a publicly-known method, a sheet-like melt is rapidly cooled by closely attaching on a cooling dram which is rotating to obtain an unstretched sheet. For example, a method using an air knife for a sheet-like melt, a method for applying static electricity, and the like can be preferably applied. The latter is preferably used among the above methods.

As a method for cooling the air side surface of the sheet-like melt, a publicly-known method can be applied. For example, a method in which a cooling liquid in a tank is brought into contact with a sheet surface, a method in which a liquid is evaporated to be applied on an air side surface of a sheet using a spray nozzle, and a method of cooling by spraying a high-velocity liquid may be used in combination. The obtained unstretched sheet is biaxially-stretched to obtain a film.

A casting speed is preferably not less than 2 m/min and not more than 200 m/min. When the casting speed is less than 2 m/min, the productivity may be decreased. When the casting speed is more than 200 m/min, crystallization may be promoted and stretching property may be lowered due to insufficient cooling. The thickness of casting is preferably not less than 50 μm and not more than 3000 μm. When the thickness is more than 3000 μm, the inside may not be sufficiently cooled, crystallization may be promoted and stretching property may be lowered in some cases.

A biaxially-stretching can be carried out at a time or sequentially. In the present invention, a lengthwise direction may be referred to as "MD" and a crosswise direction may be referred to as "TD". In any cases, stretching in MD can be carried out in one step, two steps or multi steps.

In stretching in MD, roll or infrared ray can be used, and stretching by roll is preferred since the edge part can be sufficiently preheated. As described later, stretching in MD is preferably carried out in multi steps such as two steps, not in one step, in terms of physical properties and uniformity of a width direction and a length direction.

The lower limit of a preheating temperature for MD stretching is preferably 30° C. and more preferably 35° C. When the temperature is less than 30° C., preheating may be insufficient and stretching may be difficult in some cases.

The upper limit of a preheating temperature for MD stretching is preferably 150° C., more preferably 130° C., and even more preferably 120° C. When the temperature is more than 150° C., crystallization may be induced and stretching may be difficult in some cases.

The lower limit of a temperature for MD stretching is preferably 50° C., more preferably 55° C., and even more preferably 60° C. When the temperature is less than 50° C., a resin may not be melted and stretching may be difficult in some cases.

The upper limit of a temperature for MD stretching is preferably 120° C., more preferably 115° C., and even more preferably 110° C. When the temperature is more than 120° C., crystallization may be induced and stretching may be difficult in some cases.

The lower limit of a MD stretching speed is preferably 100%/min. When the stretching speed is less than 100%/min, productivity may be decreased in some cases.

The upper limit of a MD stretching speed is preferably 1000000%/min, more preferably 900000%/min, and even more preferably 500000%/min. When the stretching speed is more than 1000000%/min, crystallization may be induced due to heat generation during stretching and subsequent stretching may be difficult in some cases.

The lower limit of a ratio of MD stretching is preferably 2.2 times, more preferably 2.3 times, and even more preferably 2.5 times. When the ratio is less than 2.2 times, accuracy of thickness in MD may be decreased, lamination strength may be become insufficient since an orientation of the surface may be excessively decreased, and impact strength may be decreased due to too low crystallization degree.

The upper limit of a ratio of MD stretching is preferably 5.0 times, more preferably 4.5 times, and most preferably 4.0 times. When the ratio is more than 5.0 times, subsequent stretching may be difficult in some cases.

When MD stretching is carried out in multi steps, the above-described stretching may be carried out in each step. With respect to a ratio, it is needed to adjust a product of total MD stretching ratio to not more than 5.0. For example, in case of stretching in two steps, it is preferred that a ratio of the first step is not less than 1.5 and not more than 2.1 and a ratio of the second step is not less than 1.5 and not more than 1.8.

The lower limit of thickness after MD stretching is preferably 10 μm. When the thickness is less than 10 μm, the film may be broken since it may become difficult to grasp the edge during subsequent TD stretching.

The upper limit of thickness after MD stretching is preferably 500 μm and more preferably 450 μm. When the thickness is more than 500 μm, stress during stretching may become too high and uniformity of thickness may be decreased during MD stretching due to insufficient stretching.

The lower limit of a preheating temperature for TD stretching is preferably 30° C. and more preferably 40° C. When the temperature is less than 30° C., preheating may be insufficient and stretching may be difficult in some cases.

The upper limit of a preheating temperature for TD stretching is preferably 150° C. and more preferably 130° C. When the temperature is more than 150° C., crystallization may be induced and stretching may be difficult in some cases.

The lower limit of a temperature for TD stretching is preferably 50° C., more preferably 55° C., and even more preferably 60° C. When the temperature is less than 50° C., stretching may be difficult in some cases since the resin may not be soften.

The upper limit of a temperature for TD stretching is preferably 180° C., more preferably 175° C., and even more preferably 170° C. When the temperature is more than 180° C., crystallization may be induced and stretching may be difficult in some cases.

The lower limit of a deformation velocity for TD stretching is preferably 10%/min and more preferably 15%/min. When the deformation velocity is less than 10%/min, crystallization may be induced due to heating during stretching and the effect of stretching may be insufficient in some cases. The upper limit of a deformation velocity for TD stretching is preferably 5000%/min and more preferably 4000%/min. When the deformation velocity is more than 5000%/min, stress during stretching may become too high and the film may be easily broken in some cases.

The lower limit of a ratio of TD stretching is 2.8 times, more preferably 3.0 times, even more preferably 3.1 times, and most preferably 3.2 times. When the ratio is less than 2.8 times, accuracy of thickness in TD may be decreased, lamination strength may be become insufficient since an orientation of the surface may be excessively decreased, and impact strength may be decreased due to too low crystallization degree.

The upper ratio of TD stretching is preferably 5.5 times, more preferably 5.0 times, even more preferably 4.7 times, particularly preferably 4.5 times, and most preferably 4.3 times. When the ratio is more than 5.5 times, productivity may be decreased in some cases.

It is an important factor for the present invention to select a temperature of heat fixation. When a heat fixation temperature is adjusted to higher, impact strength can be improved and heat shrinkage rate can be decreased due to crystallization of the film. On the other hand, when a heat fixation temperature is adjusted to low, an orientation of the surface may not be relaxed. However, when the temperature is higher than a certain temperature, an orientation of the surface is relaxed. In addition, when a heat fixation temperature is too high, the resin may become depleted and toughness of the film, such as impact strength, may be rapidly decreased due to excessive crystallization or excessive relaxation of an orientation.

It has been difficult according to a conventional method to sufficiently crystallize a resin and relax an orientation of the surface in the temperature range in which the resin hardly becomes depleted. On the other hand, in the present invention, both of the above crystallization and relaxation can be achieved by introducing other resin into the resin of the surface layer in a block manner.

The lower limit of TD heat fixation temperature is preferably 210° C. and more preferably 212° C. When the temperature is less than 210° C., lamination strength may be lowered since relaxation degree of the surface orientation may be decreased, or impact strength may be lowered due to insufficient crystallization, or appearance after lamination may be worse in some cases due to too large heat shrinkage rate.

The upper limit of TD heat fixation temperature is preferably 220° C. and more preferably 218° C. When the temperature is more than 220° C., a problem may occur after lamination since heat shrinkage rate may be excessively decreased, and impact strength may be lowered since crystallization degree may become too high and the film may become brittle.

A time for heat fixation is preferably not less than 0.5 seconds and not more than 20 seconds, and more preferably not less than 1 second and not more than 15 seconds. A time for heat fixation can be appropriately determined by considering both of heat fixation temperature and a wind velocity in a heat fixation zone. When a condition for heat fixation is not strict, the above-described problem may occur due to insufficient crystallization. When a condition for heat fixation is too strict, toughness of the film may be decreased.

It is effective for control of heat shrinkage ratio that the width between guide rails of clips is narrowed in the direction of forward movement during heat fixation treatment in order to carry out relaxation treatment. A temperature for relaxation treatment can be adjusted from a heat fixation temperature to Tg of the resin, and is preferably not less than −10° C. and not more than Tg +10° C. When the relaxation temperature is too high, the film may become deformed due to too high shrinking speed. On the other hand, when the relaxation temperature is too low, the effect of relaxation treatment may not be achieved and the film may merely become slack. As a result, thickness uniformity may be decreased not only in a width direction but also in a longitudinal direction.

The lower limit of TD relaxation rate is preferably 0.5% and more preferably 1%. When the TD relaxation rate is less than 0.5%, productivity may be decreased in some cases. The upper limit of TD relaxation rate is preferably 20%, more preferably 15%, and even more preferably 10%. When the TD relaxation rate is more than 20%, the film may become slack in a tenter and accuracy of thickness in a width direction may be decreased.

In addition, it is possible to add various additive agents in the polyamide laminated biaxially-stretched film according to the present invention as long as the properties are not inhibited. Such an additive agent is exemplified by a lubricant, an anti-blocking agent, a heat stabilizer, an antioxidant, an anti-static agent, a light stabilizer, an impact resistance improver and the like. In particular, it is preferred to add various inorganic particles in order to improve slipperiness of the biaxially-stretched film. In addition, when an organic lubricant is added, slipperiness of the film which constitutes a film roll becomes excellent. Such an organic lubricant is exemplified by ethylenebis(stearic acid), which has an effect to reduce surface energy.

It is further possible that the polyamide laminated biaxially-stretched film according to the present invention is subjected to heat treatment or humidity conditioning treatment to improve dimensional stability depending on the purpose of use. In addition, it is possible that the film is subjected to corona treatment, coating treatment and flame treatment to improve adhesive property of the film surface and the film is subjected to processing such as printing and evaporation coating.

EXAMPLES

Hereinafter, the present invention is described in more detail with Examples; however, the present invention is not limited to the following Examples. Each film was evaluated in accordance with the following measurement methods.

Relative Viscosity (RV)

The sample (0.25 g) was dissolved in 96% sulfuric acid (25 ml). A falling time (sec) of the solution (10 ml) at 20° C. was measured using Ostwald viscometer and a relative viscosity was calculated by the following formula.

$$RV=t/t0$$

wherein t0 represents a falling time of a solvent and t represents a falling time of a sample solution.

Preparation of Laminated Film

The film prepared in Examples was nipped between rolls having a width of 400 mm. The film was coated with two-component polyester adhesive (manufactured by Toyo Morton Co., TM590/CAT56=13/2 (parts by weight)) in application quantity of 3 g/m$^2$. Then, a linear low-density polyethylene film (L-LDPE film, L6102, manufactured by Toyobo Co., Ltd.) having a thickness of 40 μm was dry-laminated, and the obtained laminate was aged at 40° C. for 3 days to be a laminated film.

Lamination Strength

The above laminated film was cut to be a test piece having a width of 15 mm and a length of 200 mm, and the lamination strength between the polyamide laminated biaxially-stretched film layer and the L-LDPE film layer having a thickness of 40 μm was measured under the condition of 23° C. and 65% relative humidity using a measurement device, "Tensilon UMT-II-500 type" manufactured by Toyo Baldwin Co. The tension rate was set to 10 cm/min and the peel angle was set to 180°.

Relaxation Degree of Surface Orientation

With respect to two sides of the sample, FT-IR polarized ATR measurement was carried out in the following condition.
FT-IR device: FTS-60A/896, manufactured by Bio Rad DIGILAB
Attachment for single reflected ATR: golden gate MKII, manufactured by SPECAC
Internal reflection element: diamond
Incident angle: 45°
Polarizer: KRS-5 wire grid
Limit of resolution: 4 cm$^{-1}$
Number of scans: 128 times A relaxation degree of a surface orientation was expressed as an orientation factor: 2 Kz/(Kx+Ky), wherein Kx, Ky and Kz respectively represent absorption coefficients of MD direction, TD direction and thickness direction. The orientation factor was defined by absorption coefficients of each directions, i.e. Kx, Ky and Kz, at adsorption of about 1530 cm$^{-1}$ (bending vibration of amide bond NH) in the spectrum obtained the above-described measurement.

With respect to a relaxation degree of a surface orientation in the present invention, a smaller the value means a larger orientation, since such a smaller value represents a smaller absorption coefficient of thickness direction or a larger adsorption coefficient of a planar direction. In addition, a larger value means that an orientation degree is smaller or an orientation is relaxed.

Crystallization Degree of Surface Layer

With respect to two sides of the sample, FT-IR ATR measurement was carried out in the following condition.
FT-IR device: FTS-60A/896, manufactured by Bio Rad DIGILAB
Attachment for single reflected ATR: golden gate MKII, manufactured by SPECAC
Internal reflection element: diamond
Incident angle: 45°
Limit of resolution: 4 cm$^{-1}$
Number of scans: 128 times A crystallization degree was calculated from the intensity ratio of absorption of about 1200 cm$^{-1}$ and absorption of about 1370 cm$^{-1}$ (1200 cm$^{-1}$/1370 cm$^{-1}$). The absorption of 1200 cm$^{-1}$ corresponded to absorption of a crystal of nylon 6, and the absorption of 1370 cm$^{-1}$ corresponded to absorption which was unrelated to crystallinity.

Impact Strength

The thickness of the film was measured, and then impact strength was measured using a film impact tester manufactured by Toyo Seiki Co., Ltd. and a hemispherical impact head having a diameter of ½ inches. Impact strength was calculated in 15 μm equivalent from the measured value in accordance with the following formula.

$$\text{Impact strength}(J\text{--}15\ \mu m)=\text{Measured impact strength}(J)/\text{Thickness}(\mu m)\times 15$$

Heat Shrinkage Rate

A heat shrinkage rate was measured in accordance with the dimension change test of JIS C2318 except that a measurement temperature was 160° C. and a heating period was 10 minutes.

Melting Point

The sample was analyzed using a differential scanning calorimeter (DSC) manufactured by SII. An amount of the sample was 10 mg, and a rate of temperature increase was 20° C./min. A melting point was expressed as a measured temperature of melting endothermic peak.

Elastic Modulus

An elastic modulus was measured in accordance with JIS K 7113. Specifically, the film was cut into 10 mm width and 100 mm length in a longitudinal direction using a razor to be a sample. The cut sample was stood still in the atmosphere of 23° C. and 35% RH for 12 hours, and then measurement was carried out in the atmosphere of 23° C. and 35% RH and under the condition that interval between the chuck portions was 40 mm and a tension rate was 200 mm/min. Five measured results were averaged. As a measurement device, Autograph AG5000A manufactured by Shimadzu Corp. was used.

Haze

Haze was measured at three points of the sample in accordance with JIS K 7105 using a haze meter (NDH2000, manufactured by Nippon Denshoku Ltd.). Haze was expressed as an average value of the measured results.

Thickness Uniformity (Tv (%))

A film piece having a width of 4 cm and a length of 3 m was cut out from the central region of the obtained film roll in a lengthwise direction, and the cut film piece was divided into three pieces having a length of 1 m to be samples. With respect to the sample, measurement was carried out under the following condition using a continuous thickness gauge (micrometer: K306C, recorder: K310C, manufactured by Anritsu Electric Co., Ltd.). Specifically, a value calculated by subtracting the minimum value from the maximum value in 1 m of the sample was obtained, and an average value (ΔT average) of the three samples was calculated. Next, the three samples after the above continuous thickness measurement were stacked, thickness was measured from a distance of 5 cm from one edge at 18 points of 5 cm intervals using a dial gauge, and the numerical sum of the measured thickness at 18 points was divided by 54. The calculated value was an average thickness (T average). Then, Tv value was calculated by the following formula.

$$Tv = (\Delta T \text{ average}/T \text{ average}) \times 100(\%)$$

Measurement condition of the continuous thickness was described as follows.
Feed rate of film: 1.5 m/min
Scale of micrometer: ±5 μm
High-cut of recorder: 5 Hz
Scale of recorder: ±2 μm
Chart speed of recorder: 2.5 mm/sec
Measurement range of recorder: ×1

Example 1

A pellet of a nylon 6 resin (T814, manufactured by TOYOBO CO., LTD., RV=2.9) and a pellet of m-xylyleneadipamide resin (a polymer of m-xylylenediamine/adipamic acid, RV=2.5) which was used for relaxing an orientation were mixed at a ratio of 50 parts respectively, and the mixture was kneaded at a cylinder temperature of 270° C. using an extruder. The mixture was pelletized and then dried at 100° C. under reduced pressure, to prepare Resin (X-1) which was used for relaxing an orientation.

Next, Mixture (A-1) consisting of 92 parts of a polyamide resin (T814, manufactured by TOYOBO CO., LTD.) and 8 parts of the above Resin (X-1) was added into an extruder of which cylinder temperature was 270° C., and a m-xylyleneadipamide resin (B-1) (a polymer of m-xylylenediamine/adipamic acid, RV=2.5) which was a semi-aromatic polyamide resin was added into an extruder of which cylinder temperature was 280° C. The above Mixture (A-1) and m-xylyleneadipamide resin (B-1) were respectively melted at a resin temperature of 270° C. Then, the resins were extruded from a T die which was heated at 270° C. in a layer ratio of A-1/B-1/A-1=35/30/35, applied on a cooling roll which rotated at a speed of 6.5 m/min, and cooled and solidified to prepare a multi-layered unstretched sheet. The thickness of the unstretched sheet was 180 μm. The Tg and melting point were 35° C. and 220° C. respectively.

The above sheet was preliminarily heated at 60° C., and then longitudinally stretched 3.0 times at a stretching temperature of 65° C. and at a deformation velocity of 4000%/min. Subsequently, the sheet was continuously introduced in a tenter, and transversely stretched 3.6 times at a preheating temperature of 80° C. and a stretching temperature of 95° C. The sheet was subjected to heat fixation at 216° C. and transversely relaxed by 3%. Then, the sheet was cooled, an unstretched part was cut to be removed in the across-the-width direction. The sheet was subjected to a corona discharge treatment on the surface of the B layer of the side on which a linear low-density polyethylene film (L-LDPE film, L6102, manufactured by TOYOBO CO., LTD., 40 μm) was planned to be dry-laminated, to obtain a biaxially-stretched polyamide resin film having a thickness of 15 μm. The width and length of the film were 40 cm and 1000 m respectively. The film was spooled on a paper core. The properties of the film are shown in Table 1.

Example 2

A pellet of a nylon 6 resin (T814, manufactured by TOYOBO CO., LTD.) and a pellet of a m-xylyleneadipamide resin (a polymer of m-xylylenediamine/adipamic acid, RV=2.5) which was used for relaxing an orientation were mixed at a ratio of 35 parts and 65 parts respectively, and the mixture was kneaded at a cylinder temperature of 280° C. using an extruder. The mixture was pelletized and then dried at 100° C. under reduced pressure, to prepare Resin (X-2) which was used for relaxing an orientation.

Next, Mixture (A-2) consisting of 88 parts of a polyamide resin (T814, manufactured by TOYOBO CO., LTD.) and 12 parts of the above Resin (X-2) was added into an extruder of which cylinder temperature was 270° C., and a m-xylyleneadipamide resin (B-2) (a polymer of m-xylylenediamine/adipamic acid, RV=2.5) was added into an extruder of which cylinder temperature was 270° C. A film was prepared under similar conditions to Example 1 except for applying the conditions described in Table.

Example 3

A pellet of a nylon 6 resin (T814, manufactured by TOYOBO CO., LTD.) and a pellet of a nylon 11 resin (Rilsan, manufactured by Arkema, RV=2.8) were mixed at a ratio of 50 parts and 50 parts respectively, and the mixture was kneaded at a cylinder temperature of 270° C. using an extruder. The mixture was pelletized and then dried at 100° C. under reduced pressure, to prepare a pellet of Resin (X-3) which was used for relaxing an orientation.

Next, Mixture (A-3) consisting of 95 parts of a nylon 6 resin (T814, manufactured by TOYOBO CO., LTD.) and 5 parts of the above Resin (X-3) was added into an extruder of which cylinder temperature was 270° C., and a nylon 11 resin (Rilsan, manufactured by Arkema) was added into an extruder of which cylinder temperature was 280° C. A film was prepared under similar conditions to Example 1 except for applying the conditions described in Table.

Example 4

A pellet of a nylon 6 resin (T814, manufactured by TOYOBO CO., LTD.) and a pellet of a m-xylyleneadipamide resin (a polymer of m-xylylenediamine/adipamic acid, RV=2.5) which was used for relaxing an orientation were mixed at a ratio of 50 parts and 50 parts respectively, and the mixture was kneaded at a cylinder temperature of 270° C. using an extruder. The mixture was pelletized and then dried at 100° C. under reduced pressure, to prepare a pellet of Resin masterbatch (X-4) which was used for relaxing an orientation.

Next, Mixture (A-1) consisting of 70 parts of a nylon 6 resin (T814, manufactured by TOYOBO CO., LTD.) and 30 parts of the above Resin (X-4) was added into an extruder of which cylinder temperature was 275° C., and the mixture was melted at a resin temperature of 270° C. Then, the melt was extruded from a T die which was heated at 275° C., applied on a cooling roll which rotated at a speed of 6.5 m/min, and cooled and solidified to prepare an unstretched single-layer sheet. The thickness of the unstretched sheet was 185 μm. A film was prepared under similar conditions to Example 1 except for applying the conditions described above and in Table.

Example 5

A film was prepared under similar conditions to Example 1 except that a nylon 6 resin (T814, manufactured by TOYOBO CO., LTD.) was added into an extruder of which cylinder temperature was 270° C., a nylon 6 resin of which RV was 3.4 was added into an extruder of which cylinder temperature was 280° C., and the conditions described in Table was applied.

Comparative Example 1

A film was prepared under similar conditions to Example 1 except that both of MD stretching ratio and TD stretching ratio were changed to be lower and the conditions described in Table was applied. By lowering stretching ratio, a surface orientation could be decreased and lamination strength could be improved; however, impact strength was decreased, since a plane orientation might be too low probably.

Comparative Example 2

A film was prepared under almost similar conditions to Example 2 except that a nylon 6 resin and a resin which was used for relaxing an orientation were directly mixed and added to an extruder without preparing a resin masterbatch by preliminarily kneading the resins in an extruder, and the conditions described in Table was applied. As a result, lamination strength was considerably decreased. This is probably because the resins were not preliminarily kneaded; as a result, an effect to relax an orientation of the resin was reduced.

Comparative Example 3

A film was prepared under almost similar conditions to Example 1 except that a resin for relaxing an orientation was not used and the conditions described in Table were applied. As a result, both of lamination strength and impact strength were insufficient. This is probably because the orientation of the film surface became too higher since the resin for relaxing an orientation was not used.

Comparative Example 4

A film was prepared under almost similar conditions to Example 4 except that a resin for relaxing an orientation was not used and the conditions described in Table were applied. As a result, lamination strength was decreased. This is probably because the orientation of the film surface became too higher since the resin for relaxing an orientation was not used.

Comparative Example 5

A film was prepared under almost similar conditions to Example 4 except that a resin for relaxing an orientation was not used, a heat fixation temperature was adjusted to higher and the conditions described in Table were applied. As a result, impact strength was decreased, though an orientation of the film surface was relaxed and lamination strength was improved in comparison with Comparative Example 4 due to higher heat fixation temperature. This is probably because mechanical properties were lowered due to excessive relaxation of an orientation.

Comparative Example 6

A film was prepared under almost similar conditions to Example 1 except that an amount of a resin for relaxing an orientation in the surface layer was increased and the conditions described in Table were applied. As a result, impact strength was decreased. This is probably because an orientation of the total skin layer was excessively relaxed and mechanical properties were lowered, since a resin for relaxing an orientation was excessively added.

Comparative Example 7

A film was prepared under similar conditions to Example 4 except that an amount of a resin for relaxing an orientation in the surface layer was increased, a temperature of heat fixation was lowered and the conditions described in Table were applied. As a result, heat shrinkage ratio was worsened, impact strength could not be improved, and lamination strength and impact strength could not be balanced. This is probably because oriented crystallization hardly occurred due to too much amount of a resin for relaxing an orientation, heat quantity for heat fixation was insufficient, and mechanical properties and heat resistance were lowered.

Comparative Example 8

A film was prepared under similar conditions to Example 4 except that an amount of a resin for relaxing an orientation in the surface layer was increased in comparison with Example 4, a temperature of heat fixation was further lowered in comparison with Comparative Example 7 and the conditions described in Table were applied. As a result, both of heat shrinkage ratio and lamination strength were considerably worsened. With respect with the above conditions, it was needed to lower a temperature of heat fixation, since an orientation was easily relaxed even with a small amount of heat quantity due to too much amount of a resin for relaxing an orientation. Therefore, relaxation degree of an orientation and improvement of heat shrinkage ratio for increasing lamination strength could not be balanced.

Comparative Example 9

A film was prepared under similar conditions to Example 4 except that a nylon resin copolymer (Amilan CM6021M, manufactured by Toray industries, inc., melting point: 214° C.) was used and the conditions described in Table were applied.

Comparative Example 10

A film was prepared under almost similar conditions to Example 2 except that a nylon 6 resin and a resin for relaxing an orientation were directly mixed and added to an extruder without preparing a resin masterbatch by preliminarily kneading the resins in an extruder, and the conditions described in Table was applied. With respect to the above conditions, lamination strength was expected to be improved by increasing a heat fixation temperature. However, improvement could not shown, and only impact strength was decreased. This is probably because an effect to relax an orientation by the resin for relaxing an orientation was reduced since the resins were not preliminarily kneaded.

TABLE 1-1

|  | Measurement method | Example 1 | Example 2 | Example 3 | Example 4 | Example 5 |
|---|---|---|---|---|---|---|
| Additive amount of resin other than Ny6 as a base resin in surface layer (wt %) | | 8 | 12 | 5 | 15 | |
| Additive amount of resin having RV different from Ny6 as a base resin in surface layer (wt %) | | | | | | 100 |
| Ratio of Ny6 in surface layer (wt %) | | 92 | 88 | 95 | 92 | 100 |
| Molecular weight of Ny6 in surface layer (RV) | | 2.9 | 2.9 | 2.9 | 2.9 | 3.4 |
| Resin added in surface layer | | polyamide | polyamide | polyamide | polyamide | no |
| Pleriminarily forming of masterbatch | | done | done | done | done | |
| Change of surface layer RV | | | | | | done |
| Layer constitution | | 2 resins 3 layers | 2 resins 3 layers | 2 resins 3 layers | 1 layer | 2 resins 3 layers |
| Surface layer composition | | Ny6 + semiaromatic PA | Ny6 + semiaromatic PA | Ny6 + Ny11 | Ny6 + semiaromatic PA | Ny6 |
| Core layer composition | | semiaromatic PA | Ny6 | Ny11 | Ny6 + semiaromatic PA | Ny6 |
| Total thickness of surface layer (μm) | Cross-section observation using light microscope or electron microscope | 5.25 | 4 | 5 | 12 | 3 |
| Film thickness (μm) | | 15 | 15 | 16 | 12 | 18 |
| Die temperature (° C.) | | 270 | 265 | 270 | 275 | 270 |

TABLE 1-2

|  | Measurement method | Comparative Example 1 | Comparative Example 2 | Comparative Example 3 | Comparative Example 4 | Comparative Example 5 |
|---|---|---|---|---|---|---|
| Additive amount of resin other than Ny6 as a base resin in surface layer (wt %) | | 10 | 10 | 0 | 0 | 0 |
| Additive amount of resin having RV different from Ny6 as a base resin in surface layer (wt %) | | | | | | |
| Ratio of Ny6 in surface layer (wt %) | | 90 | 90 | 0 | 0 | 0 |
| Molecular weight of Ny6 in surface layer (RV) | | 2.9 | 2.9 | 2.9 | 2.9 | 2.9 |
| Resin added in surface layer | | polyamide | polyamide | no | no | no |
| Pleriminarily forming of masterbatch | | done | not-done | not-done | not-done | not-done |
| Change of surface layer RV | | | | | | |
| Layer constitution | | 2 resins 3 layers | 2 resins 3 layers | 2 resins 3 layers | 1 layer | 1 layer |
| Surface layer composition | | Ny6 + semiaromatic PA | Ny6 + semiaromatic PA | Ny6 | Ny6 | Ny6 |
| Core layer composition | | semiaromatic PA | Ny6 | semiaromatic PA | Ny6 | Ny6 |
| Total thickness of surface layer (μm) | Cross-section observation using light microscope or electron microscope | 6 | 6 | 6 | 15 | 15 |
| Film thickness (μm) | | 15 | 15 | 14 | 15 | 15 |
| Die temperature (° C.) | | 270 | 270 | 275 | 270 | 265 |

|  |  | Comparative Example 6 | Comparative Example 7 | Comparative Example 8 | Comparative Example 9 | Comparative Example 10 |
|---|---|---|---|---|---|---|
| | Additive amount of resin other than Ny6 as a base resin in surface layer (wt %) | 18 | 18 | 18 | 100 | 10 |
| | Additive amount of resin having RV different from Ny6 as a base resin in surface layer (wt %) | | | | | |

TABLE 1-2-continued

|  |  |  |  |  |  |
|---|---|---|---|---|---|
| Ratio of Ny6 in surface layer (wt %) | 82 | 82 | 82 | 0 | 90 |
| Molecular weight of Ny6 in surface layer (RV) | 2.9 | 2.9 | 2.9 | 2.8 | 2.9 |
| Resin added in surface layer | polyamide | polyamide | polyamide | no | polyamide |
| Pleriminarily forming of masterbatch Change of surface layer RV | done | done | done | not-done | not-done |
| Layer constitution | 2 resins 3 layers | 1 layer | 1 layer | 1 layer | 2 resins 3 layers |
| Surface layer composition | Ny6 + semiaromatic PA | Ny6 + semiaromatic PA | Ny6 + semiaromatic PA | copolymeric Ny | Ny6 + semiaromatic PA |
| Core layer composition | semiaromatic PA | Ny6 + semiaromatic PA | Ny6 + semiaromatic PA | copolymeric Ny | Ny6 |
| Total thickness of surface layer (μm) | 6 | 15 | 15 | 15 | 6 |
| Film thickness (μm) | 15 | 15 | 15 | 15 | 15 |
| Die temperature (° C.) | 270 | 270 | 270 | 265 | 270 |

TABLE 1-3

|  | Example 1 | Example 2 | Example 3 | Example 4 | Example 5 |
|---|---|---|---|---|---|
| Cooling roll temperature (° C.) | 20 | 20 | 20 | 20 | 20 |
| Casting speed (m/min) | 6.5 | 6.5 | 6.1 | 6.3 | 6.5 |
| Casting thickness (μm) | 180 | 180 | 190 | 185 | 180 |
| Streching method | sequentially | sequentially | sequentially | sequentially | sequentially |
| MD stretching method | 1 step | 2 steps | 1 step | 1 step | 1 step |
| MD stretching method | roll | roll | roll | roll | roll |
| MD preheating temperature (° C.) | 60 | 70 | 60 | 60 | 60 |
| MD stretching temperature (° C.) | 65 | 70 | 65 | 65 | 65 |
| MD stretching speed (%/min) | 4000 | 1950 × 1950 | 4400 | 3800 | 4000 |
| MD ratio (times) | 3 | 3 | 3.2 | 3.1 | 3 |
| Thickness after MD stretching (μm) | 55 | 50 | 58 | 48 | 65 |
| TD preheating temperature (° C.) | 80 | 100 | 120 | 100 | 90 |
| TD streching temperature (° C.) | 95 | 105 | 100 | 90 | 95 |
| TD ratio (times) | 3.6 | 3.2 | 3.4 | 3.7 | 3.5 |
| TD heat fixation temperature (° C.) | 218 | 215 | 218 | 212 | 216 |
| TD relaxation ratio (%) | 3 | 3 | 4 | 5 | 3 |
| Thickness after biaxially-stretching (μm) | 15 | 15 | 16 | 12 | 18 |

TABLE 1-4

|  | Comparative Example 1 | Comparative Example 2 | Comparative Example 3 | Comparative Example 4 | Comparative Example 5 |
|---|---|---|---|---|---|
| Cooling roll temperature (° C.) | 20 | 20 | 20 | 20 | 20 |
| Casting speed (m/min) | 15 | 7.5 | 8.5 | 5 | 6.5 |
| Casting thickness (μm) | 80 | 150 | 135 | 220 | 180 |
| Streching method | sequentially | sequentially | sequentially | sequentially | sequentially |
| MD stretching method | 1 step | 2 steps | 1 step | 1 step | 1 step |
| MD stretching method | roll | roll | roll | roll | roll |
| MD preheating temperature (° C.) | 60 | 65 | 60 | 65 | 60 |
| MD stretching temperature (° C.) | 70 | 65 | 65 | 70 | 65 |
| MD stretching speed (%/min) | 2500 | 1950 × 1950 | 4000 | 3200 | 4400 |
| MD ratio (times) | 2 | 3 | 3 | 3.8 | 3.2 |
| Thickness after MD stretching (μm) | 38 | 46 | 45 | 60 | 55 |
| TD preheating temperature (° C.) | 100 | 90 | 100 | 100 | 95 |
| TD streching temperature (° C.) | 95 | 100 | 105 | 100 | 105 |
| TD ratio (times) | 2.5 | 3.5 | 3.2 | 3.8 | 3.5 |
| TD heat fixation temperature (° C.) | 217 | 212 | 216 | 210 | 218 |
| TD relaxation ratio (%) | 3 | 3 | 3 | 3 | 3 |
| Thickness after | 15 | 13 | 14 | 15 | 15 |

TABLE 1-4-continued biaxially-stretching (μm)

| | Comparative Example 6 | Comparative Example 7 | Comparative Example 8 | Comparative Example 9 | Comparative Example 10 |
|---|---|---|---|---|---|
| Cooling roll temperature (° C.) | 20 | 20 | 20 | 20 | 20 |
| Casting speed (m/min) | 6.5 | 7.5 | 6.5 | 6.5 | 7.5 |
| Casting thickness (μm) | 180 | 150 | 180 | 180 | 150 |
| Strenching method | sequentially | sequentially | sequentially | sequentially | sequentially |
| MD stretching method | 1 step | 1 step | 1 step | 1 step | 2 steps |
| MD stretching method | roll | roll | roll | roll | roll |
| MD preheating temperature (° C.) | 60 | 60 | 65 | 60 | 65 |
| MD stretching temperature (° C.) | 65 | 65 | 65 | 65 | 65 |
| MD stretching speed (%/min) | 4000 | 4000 | 4000 | 4000 | 1950 ×1950 |
| MD ratio (times) | 3 | 3 | 3 | 3 | 3 |
| Thickness after MD stretching (μm) | 55 | 50 | 55 | 58 | 46 |
| TD preheating temperature (° C.) | 110 | 100 | 100 | 100 | 90 |
| TD strenching temperature (° C.) | 95 | 95 | 100 | 95 | 100 |
| TD ratio (times) | 3.6 | 3.6 | 3.6 | 3.6 | 3.5 |
| TD heat fixation temperature (° C.) | 215 | 210 | 200 | 205 | 218 |
| TD relaxation ratio (%) | 3 | 3 | 3 | 3 | 3 |
| Thickness after biaxially-stretching (μm) | 15 | 15 | 15 | 15 | 13 |

TABLE 2-1

| | Measurement method | Example 1 | Example 2 | Example 3 | Example 4 | Example 5 |
|---|---|---|---|---|---|---|
| Relaxation degree of surface layer orientation mesured by IR spectroscopy | IR spectroscopy | 0.34 | 0.38 | 0.44 | 0.35 | 0.32 |
| Crystallization degree of surface layer orientation mesured by IR spectroscopy | IR spectroscopy | 1.24 | 1.16 | 1.32 | 1.07 | 1.39 |
| Heat shrinkage ratio (%) in TD direction at 160° C. for 10 min | Heat shrinkage ratio | 1 | 1.3 | 0.9 | 1.2 | 1.3 |
| Lamination strength (N/15 mm) | | 7.8 | 8 | 7.5 | 8 | 7.9 |
| Impact strength (J) | | 1.1 | 1 | 0.8 | 0.8 | 1.1 |
| Melting point (° C.) | | 220 | 220 | 215 | 220 | 224 |
| Elastic modulus (GPa) | | 2.2 | 2.5 | 2.3 | 2.5 | 2.2 |
| Haze (%) | | 2.4 | 3.1 | 2.6 | 4.5 | 2.1 |
| Thickness uniformity Tv (%) | | 11 | 14 | 15 | 13 | 10 |

TABLE 2-2

| | Measurement method | Comparative Example 1 | Comparative Example 2 | Comparative Example 3 | Comparative Example 4 | Comparative Example 5 |
|---|---|---|---|---|---|---|
| Relaxation degree of surface layer orientation mesured by IR spectroscopy | IR spectroscopy | 0.48 | 0.27 | 0.3 | 0.2 | 0.25 |
| Crystallization degree of surface layer orientation mesured by IR spectroscopy | IR spectroscopy | 0.94 | 1.45 | 1.5 | 1.59 | 1.4 |
| Heat shrinkage ratio (%) in TD direction at 160° C. for 10 min | Heat shrinkage ratio | 0.3 | 1.1 | 1.2 | 2.4 | 0.8 |
| Lamination strength (N/15 mm) | | 7.4 | 6 | 6.5 | 2.5 | 7.7 |

TABLE 2-2-continued

| | | | | | |
|---|---|---|---|---|---|
| Impact strength (J) | 0.6 | 1 | 0.7 | 0.8 | 0.4 |
| Melting point (° C.) | 218 | 218 | 222 | 222 | 222 |
| Elastic modulus (GPa) | 2.2 | 2.3 | 2 | 2.1 | 2.2 |
| Haze (%) | 2.4 | 2.8 | 2.1 | 2.1 | 2 |
| Thickness uniformity Tv (%) | 35 | 14 | 24 | 29 | 32 |

| | Comparative Example 6 | Comparative Example 7 | Comparative Example 8 | Comparative Example 9 | Comparative Example 10 |
|---|---|---|---|---|---|
| Relaxation degree of surface layer orientation mesured by IR spectroscopy | 0.53 | 0.36 | 0.28 | 0.54 | 0.28 |
| Crystallization degree of surface layer orientation mesured by IR spectroscopy | 0.88 | 0.95 | 1.05 | 0.91 | 1.31 |
| Heat shrinkage ratio (%) in TD direction at 160° C. for 10 min | 1.4 | 4.5 | 9.2 | 2.1 | 1.1 |
| Lamination strength (N/15 mm) | 6.8 | 6.8 | 4.2 | 5.8 | 6 |
| Impact strength (J) | 0.5 | 0.6 | 1 | 0.7 | 0.4 |
| Melting point (° C.) | 218 | 218 | 218 | 200 | 220 |
| Elastic modulus (GPa) | 2.5 | 2.3 | 1.8 | 1.8 | 2.1 |
| Haze (%) | 10.5 | 12.6 | 9.7 | 5.1 | 5.2 |
| Thickness uniformity Tv (%) | 40 | 28 | 25 | 21 | 24 |

INDUSTRIAL APPLICABILITY

According to the present invention, it is possible to provide a packaging or industrial stretched polyamide film which is excellent in adhesive property and lamination strength, which does not become brittle even through excessive heat treatment, which has mechanical properties intrinsic to a polyamide film and which is excellent in break resistance property and pinhole resistance property when used as a raw material for a bag.

The invention claimed is:

1. A stretched polyamide film, wherein a main constituent is nylon 6;
at least one surface layer satisfies the following conditions (1) and (2); and
the stretched polyamide film satisfies the following condition (3):
(1) an orientation factor: $2Kz/(Kx+Ky)$ defined by the absorption coefficients of the machine direction Kx, the transverse direction Ky, and the thickness direction Kz, respectively, of the bending vibration of the amide bond NH in the spectrum determined by FT-IR polarized attenuated total reflection (ATR) measurement is within a range of not less than 0.3 and not more than 0.5;
(2) an intensity ratio of absorption at 1200 cm$^{-1}$ to absorption at 1370 cm$^{-1}$ (1200 cm$^{-1}$ /1370 cm$^{-1}$) determined by FT-IR polarized ATR measurement is within a range of not less than 1.0 and not more than 1.4;
(3) a heat shrinkage rate (%) in the transverse direction is within a range of not less than 0.6 and not more than 4 when measured in accordance with JIS C2318 except at 160° C. for a heating period of 10 minutes.

2. The stretched polyamide film according to claim 1, wherein
the surface layer contains nylon 6 and a resin other than nylon 6;
the surface layer satisfies the conditions (1) and (2); and
the stretched polyamide film satisfies the condition (3).

3. The stretched polyamide film according to claim 1, comprising at least two layers composed of nylon 6;
wherein
relative viscosities of the layers composed of nylon 6 are different each other;
the stretched polyamide film has the layer composed of nylon 6 having higher relative viscosity on the surface;
the surface layer satisfies the conditions (1) and (2); and
the stretched polyamide film satisfies the condition (3).

4. The stretched polyamide film according to claim 1, wherein the orientation factor of condition (1) is within a range of not less than 0.31 and not more than 0.5.

5. The stretched polyamide film according to claim 4, wherein the intensity ratio of absorption of condition (2) is within a range of not less than 1.0 and not more than 1.39.

6. The stretched polyamide film according to claim 4, wherein the orientation factor of condition (1) is within a range of not less than 0.32 and not more than 0.5.

7. The stretched polyamide film according to claim 6, wherein the intensity ratio of absorption of condition (2) is within a range of not less than 1.0 and not more than 1.38.

8. The stretched polyamide film according to claim 2, wherein the orientation factor of condition (1) is within a range of not less than 0.31 and not more than 0.5.

9. The stretched polyamide film according to claim 8, wherein the intensity ratio of absorption of condition (2) is within a range of not less than 1.0 and not more than 1.39.

10. The stretched polyamide film according to claim 8, wherein the orientation factor of condition (1) is within a range of not less than 0.32 and not more than 0.5.

11. The stretched polyamide film according to claim 10, wherein the intensity ratio of absorption of condition (2) is within a range of not less than 1.0 and not more than 1.38.

12. The stretched polyamide film according to claim 3, wherein the orientation factor of condition (1) is within a range of not less than 0.31 and not more than 0.5.

13. The stretched polyamide film according to claim 12, wherein the intensity ratio of absorption of condition (2) is within a range of not less than 1.0 and not more than 1.39.

14. The stretched polyamide film according to claim 12, wherein the orientation factor of condition (1) is within a range of not less than 0.32 and not more than 0.5.

15. The stretched polyamide film according to claim 14, wherein the intensity ratio of absorption of condition (2) is within a range of not less than 1.0 and not more than 1.38.

* * * * *